United States Patent
Wang et al.

(10) Patent No.: US 11,132,623 B2
(45) Date of Patent: Sep. 28, 2021

(54) USER ADAPTED DATA PRESENTATION FOR DATA LABELING

(71) Applicant: International Business Machines Corporation, Armonk, NY (US)

(72) Inventors: Shiqiang Wang, White Plains, NY (US); Irene Lizeth Manotas Gutierrez, Yorktown Heights, NY (US); Bong Jun Ko, Harrington Park, NJ (US); Keith William Grueneberg, Stewart Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 421 days.

(21) Appl. No.: 16/160,721

(22) Filed: Oct. 15, 2018

(65) Prior Publication Data
US 2020/0118042 A1     Apr. 16, 2020

(51) Int. Cl.
*G06N 20/00* (2019.01)
*G06N 5/02* (2006.01)
*G06F 16/23* (2019.01)

(52) U.S. Cl.
CPC ......... *G06N 20/00* (2019.01); *G06F 16/2365* (2019.01); *G06N 5/022* (2013.01)

(58) Field of Classification Search
CPC ........ G06N 20/00; G06N 5/022; G06N 5/025; G06F 16/2365
USPC .......................................................... 706/12
See application file for complete search history.

(56) References Cited

U.S. PATENT DOCUMENTS

| | | | |
|---|---|---|---|
| 7,930,676 B1* | 4/2011 | Thomas .............. | G06F 9/44505 717/100 |
| 8,022,831 B1 | 9/2011 | Wood-Eyre | |
| 8,538,320 B2 | 9/2013 | Ho et al. | |
| 8,683,348 B1* | 3/2014 | Blank ..................... | G06F 3/011 715/745 |
| 10,552,752 B2* | 2/2020 | Kashyap ................ | G06N 7/005 |
| 10,558,740 B1* | 2/2020 | O'Malley ............. | G06F 40/197 |
| 2014/0109142 A1 | 4/2014 | van Coppenolle et al. | |
| 2016/0350658 A1 | 12/2016 | Kedia et al. | |

OTHER PUBLICATIONS

Edison Thomaz, Interactive Techniques for Labeling Activities of Daily Living to Assist Machine Learning, Atlanta, GA.
Pinar Donmez et al., Proactive Learning Cost Sensitive Active Learning with multiple Imperfect Oracles, 2008.
Huang et al; Active Learning with Oracle Epiphany, 30th Conference on Neural Information Processing Systems (NIPS 2016), Barcelona, Spain.
Amazon; Mechanical Turk; Human Intelligence Throgh an API, 2018.

* cited by examiner

*Primary Examiner* — Jonathan Han
(74) *Attorney, Agent, or Firm* — Garg Law Firm, PLLC; Rakesh Garg; Joseph Petrokaitis

(57) ABSTRACT

A user input is analyzed during labeling of a first portion of data to determine a behavior of a user. A labeling accuracy rate of the user is forecasted. A characteristic of a second portion of data to be presented to the user at a second time is determined. The second portion of data is presented to the user. A second label corresponding to the second portion of data is received. A second user input is analyzed to determine a second behavior of the user. The accuracy prediction model is refined. A second labeling accuracy rate of the user is forecasted. The recommendation model is refined.

20 Claims, 6 Drawing Sheets

USER ADAPTED DATA PRESENTATION FOR DATA LABELING

TECHNICAL FIELD

The present invention relates generally to a method, system, and computer program product for using machine learning in data labeling. More particularly, the present invention relates to a method, system, and computer program product for user adapted data presentation for data labeling.

BACKGROUND

Many machine learning applications require the use of labeled or classified data, for use in both training a model to perform a task and in validating that the model performs the task correctly. For example, when developing a model to classify images, the model is often trained using a dataset of already-classified images and their respective classifications. If the desired model is meant to sort photographic images including vehicles from photos that do not contain vehicles, such a dataset might include a set of photos, each labeled "includes a vehicle" and another set of photos, each labeled "does not include a vehicle". Using such a dataset for training and using machine learning techniques, a model can be trained to sort new images into two categories: those that include a vehicle and those that do not. Using such a dataset for validation, the model, now trained, can be validated to determine that it does indeed classify images correctly.

Image classification is only one example of a technique that requires large amounts of already-classified example data. Machine learning is being applied to a wide variety of tasks, and each requires labeled datasets. As well, other applications beyond machine learning—to take only one example, document review for due diligence or litigation applications—also involve data labeling.

Typically, human workers use a software application called a review platform to label data. Such review platforms allow users to review and classify any human-perceivable form of data, such as images, sounds, or documents. For example, to label images, workers often use a software application that supplies them with both an image and an input field that allows a worker to apply a classification to the displayed image. Similarly, large-scale document review typically involves human workers using a software application to review documents and apply classifications to each document. Such review platforms use a variety of algorithms for deciding which document, image, or other content to supply to a user for review, from simple (e.g. choose the next item in numerical order or choose the next item in a particular category in numerical order) to the more complex.

SUMMARY

The illustrative embodiments provide a method, system, and computer program product. An embodiment includes a method that analyzes a user input during labeling of a first portion of data to determine a behavior of a user. An embodiment forecasts, using the behavior and an accuracy prediction model, a labeling accuracy rate of the user. An embodiment determines, using the forecasted labeling accuracy rate, the first portion of data, and a recommendation model, a characteristic of a second portion of data to be presented to the user at a second time. An embodiment presents, to the user, the second portion of data, the second portion of data selected for presentation according to the characteristic. An embodiment receives, from the user, a second label corresponding to the second portion of data. An embodiment analyzes a second user input during the second labeling to determine a second behavior of the user. An embodiment refines, using the second behavior, the accuracy prediction model. An embodiment forecasts, using the second behavior and the accuracy prediction model, a second labeling accuracy rate of the user. An embodiment refines, using the second behavior and the second labeling accuracy rate, the recommendation model.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
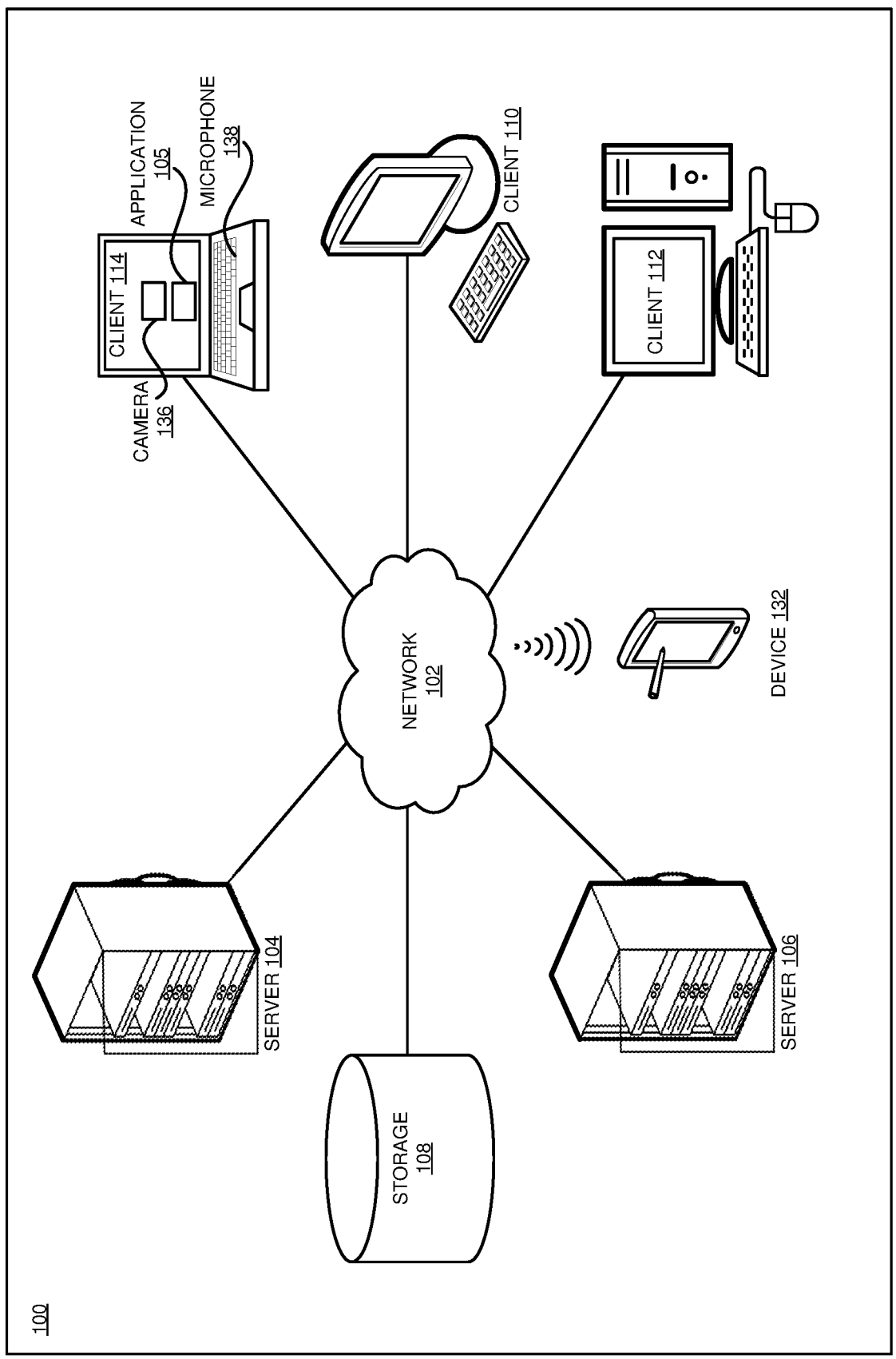
FIG. 1 depicts a block diagram of a network of data processing systems in which illustrative embodiments may be implemented.

The data labeling task is, by its nature, repetitive and often boring. Further, workers are often paid based on the number of pieces of data they review, and review platforms may monitor workers' speed, adding to pressure to perform the task quickly. After hours spent performing such a repetitive task quickly, workers' accuracy often diminishes, especially when classifying many samples of similar data such as similar-looking images, voices that sound similar, or similar-looking documents containing only small but potentially important differences.

The illustrative embodiments recognize that a need exists to maintain worker accuracy when labeling data. If data is not labeled accurately, the results of any operations using the inaccurate data will also be inaccurate.

The illustrative embodiments also recognize that checking worker accuracy, for example by comparing one worker's results against those of another, introduces inefficiencies. Having multiple workers classify the same data for accuracy verification purposes takes time that could be otherwise spent having workers classify new data. Insufficient verification also propagates errors when mis-classified data is used later. Consequently, there is a need to manage worker accuracy proactively, before a significant deterioration occurs.

The illustrative embodiments recognize that the presently available tools or solutions do not address these needs or provide adequate solutions for these needs. The illustrative embodiments used to describe the invention generally address and solve the above-described problems and other problems related to user adapted data presentation for data labeling.

An embodiment can be implemented as a software application. The application implementing an embodiment can be configured as a modification of an existing data labeling system, as a separate application that operates in conjunction with an existing data labeling system, a standalone application, or some combination thereof.

Some illustrative embodiments provide a method by which, while users are using a data labeling system, user behavior can be monitored and analyzed, user behavior consistent with increasing inaccuracy can be determined, and data provided to the user for labeling can be adjusted to improve accuracy.

The illustrative embodiments make use of the observation that users doing repetitive tasks such as data labeling often exhibit different behaviors during the course of performing the tasks, and that users exhibit many of these behaviors in conjunction with declines in user accuracy. Users' response times when presented with new data to label may change. For example, users may slow down in providing a label because they are growing tired or distracted. Users may also speed up, labeling too quickly without proper consideration of necessary details. Users' response times may also increase if new data is more complicated than data users have been labeling previously, and decrease if new data is simpler than, or very similar to, than data users have been labeling previously.

Users' text input speeds and accuracy, pointing device movement and pointing device click patterns, and other data input characteristics may also change. For instance, users may click their mouse or equivalent device in incorrect places and then fix the errors, or type or handwrite more slowly or with more errors.

Users may also exhibit different facial expressions—for example, they may be exhibiting sleepiness by their eyes closing more frequently, or they may be fighting sleepiness by opening their eyes wider or blinking more frequently. Users may also make different sounds, such as yawning or talking to themselves. Biometric user monitoring may also detect other user behaviors. For examples, a user activity monitor, or a weight or movement sensor configured to monitor a user's chair, can detect a user fidgeting or shifting his or her weight. A heartbeat sensor or activity monitor can detect whether a user is agitated or verging on sleep.

An illustrative embodiment presents a piece of data to a user for labeling, or causes the presentation of a piece of data to a user for labeling. Such data can be in any format perceivable by a user, such as audio, video, a static image, text, or a combination of more than one format.

An illustrative embodiment also receives user input labeling the presented data. Such labeling input can be in any suitable format, such as a selection from a displayed list or one or more selections from a set of checkboxes. For example, in classifying images for use in vehicle recognition, a user might select the "yes" option from a list labeled "Is a vehicle present?" and then select checkboxes corresponding to various vehicular features that are visible in the image. A user might also enter free-form text input, a voice annotation (such as "yes" or "no"), or provide classifying information by another method.

An illustrative embodiment also monitors user behavior, as users enter input labeling the presented data. An embodiment monitors user response time—the time between being presented with a piece of data to classify and providing a classification input.

An embodiment monitors user consistency. For example, an embodiment can present a user with a piece of data that the user has previously classified, to check whether the user labels that piece of data consistently with his or her previous labeling. An embodiment can also present a user with a piece of data that is very similar to a piece of data that the user has previously classified, to check whether the user labels the new piece of data consistently with his or her previous labeling. An embodiment determines consistency with previous labeling using any suitable technique. For example, one embodiment accepts two pieces of data as being labeled consistently by the same user only if all labeling applied to each pieces of data is identical. Another embodiment accepts two pieces of data as being labeled consistently by the same user if the two pieces of data have no labeling differences for labels in a major category of labels, and only a twenty percent difference in labels for labels in a minor category of labels. An embodiment has previously determined similarity through any suitable means, whether human-classified, machine-only methods, or a combination.

An embodiment monitors consistency across users. For example, an embodiment can present a user with a piece of data that one or more other users have previously classified, or a piece of data very similar to data one or more other users have previously classified, to check whether the user labels the new piece of data consistently with others' labeling. An embodiment determines consistency with previous labeling, and computes a consistency score. For example, one embodiment accepts two pieces of data as being labeled consistently only if all labeling applied to each pieces of data is identical. Another embodiment accepts two pieces of data as being labeled consistently if the two pieces of data have no labeling differences for labels in a major category of labels, and only a twenty percent difference in labels for labels in a minor category of labels. Here, an embodiment has previously determined similarity through any suitable technique, whether human-classified, machine-only methods, or a combination.

An embodiment is also configurable to monitor users' data input actions on a review platform. Such actions can include text input speed, one or more measures of text input accuracy (e.g. how often the user deletes and re-enters text or in a text input field), pointing device movement and pointing device click patterns (such as how many clicks are necessary for a user to successfully select a checkbox, or whether mouse movements are smooth or jerky), and the like. For instance, when becoming tired a user may click a pointing device in incorrect places and then fix the errors, or type slower and with more errors. An embodiment uses one or more of a user's pointing device inputs to compute a data input efficiency score for the user.

An embodiment is also configurable to monitor aspects of user behavior that are not direct inputs to an embodiment. For example, an embodiment can use a camera and facial expression monitoring techniques to monitor users' facial expressions—such as closing their eyes more frequently, or opening their eyes wider or blinking more frequently. As another example, an embodiment can use a microphone and sound recognition techniques to monitor and recognize the sounds users make, such as yawning or talking.

An illustrative embodiment includes an accuracy prediction model that, given user behavior as an input, predicts user accuracy in labeling as an output. In contrast to measuring user accuracy, which would require data from additional users to check a first user's accuracy, predicting user accuracy does not require such additional checks. As a result, more users of an embodiment can be used to classify data instead of checking each other, improving efficiency.

User behavior inputs include user response time, the results of consistency checks (for either one user or compared to other users), users' data input actions, and other aspects of user behavior. The accuracy prediction model uses rules correlating particular combinations of user behavior with particular accuracy rates. An example of such a rule might be that when the time it takes a user to label a new piece of data rises to more than two standard deviations above the user's average response time, inaccuracy can be expected to increase to the same degree. A more complex rule might be that when user labeling consistency falls outside a consistency threshold, the user revises his or her text entries at a rate one standard deviation higher than the user's average revision rate, and the user's eyes appear to be closed for more than one standard deviation away from the user's average, inaccuracy can also be expected to rise to a predicted degree (because the user appears to be falling asleep).

Such rules, or other information included in the model, can be implemented by humans based on observations of users. Alternatively, a model can be trained using known machine learning techniques, or a model can synthesize rules itself using known machine learning techniques. In any case, a model is not developed based only on observations of the behavior of one particular user, and is not specific to any particular user or eventual user of an embodiment.

An illustrative embodiment includes a recommendation model that, given predicted user inaccuracy and the data a user has recently been presented with to label, produces one or more recommendations for the next data to be presented to a user for labeling.

One possible recommendation is to present the user with similar data as the user has already labeled. For example, if the user is labeling such data consistently, and this behavior is predicted to continue, there is no reason to make a change.

Another possible recommendation is to present the user with different data, but of the same type of data as the user has already labeled. For example, if a user has been examining a set of images that look similar to each other, but is predicted to become more inaccurate, the recommendation model might recommend that this user switch to labeling a set of images that look very different from the first set.

Another possible recommendation is to present the user with a different type of data. For example, if a user has been reviewing one type of document, such as spreadsheets, the recommendation model might recommend that this user switch to labeling emails, other text documents, or presentations instead.

Another possible recommendation is to present the user with a different type of media. For example, if a user has been reviewing one type of media—for example, audio—the recommendation model might recommend that this user switch to reviewing another type of media, such as text or images.

Such a model uses rules correlating particular combinations of recent data presented to a user with particular accuracy rates. For example, one such rule might be that if the user has been reviewing voice data for the last thirty minutes and is predicted to exhibit more than a threshold level of accuracy in the next five minutes, the user should switch to reviewing a different type of media. The rules, or other information included in the model, can be implemented by humans based on observations of users. Alternatively, a model can be trained using known machine learning techniques, or a model can synthesize rules itself using known machine learning techniques. In any case, a model is not developed based only on observations of the behavior of one particular user, and is not specific to any particular user or eventual user of an embodiment.

An embodiment uses recommendations from the recommendation model to determine new data to present to the user for labeling. For example, the embodiment might present a different type of media or different document type. In addition, an embodiment also uses recommendations from the recommendation model to suggest other actions to the user. For example, an embodiment could suggest or mandate that the user take a rest break away from the embodiment, or interact with the embodiment while standing or walking.

An embodiment uses the results of the recommendations, as shown by the user's subsequent behavior and labeling results, to adapt both the accuracy prediction model and the recommendation model. For example, if the accuracy prediction model predicts an increased inaccuracy rate for a user when classifying text documents, but the user's labeling of text documents remains consistent with both the user's previous results and those of others, the embodiment adjusts the accuracy prediction model accordingly. Perhaps this user finds text classification easy enough that tiredness does not affect his consistency. As another example, if the accuracy prediction model predicts an increased inaccuracy rate for a new user on the basis of detecting a series of rapid eyeblinks, but the user's labeling remains consistent with others' labeling, the embodiment adjusts the accuracy prediction model accordingly. Perhaps this user simply blinks more rapidly than average, and this behavior is not predictive of inaccuracy for this particular user.

Similarly, if the recommendation model recommends switching the data presented to the user to a different type of document, but the user's predicted inaccuracy remains high, perhaps this was not enough of a change for this particular user. Instead, the recommendation model might recommend switching to a different media type, if one is available, or recommending or enforcing a rest break, and evaluating the results of the new recommendations.

Thus, each model, while initially configured to recommend actions for a generic user, gradually adapts to the particularities of an individual user. Such adaptations can also be incorporated into updated versions of the generic models once sufficient user data has been collected.

The manner of user adapted data labeling described herein is unavailable in the presently available methods. A method of an embodiment described herein, when implemented to execute on a device or data processing system, comprises substantial advancement of the functionality of that device or data processing system in improving the accuracy of data labeled by users for future use in other data processing systems, by, while a user is using a data labeling system, monitoring and analyzing the user's behavior while the user is presented with data for labeling, evaluating the user's responses to the presented data as well as the user's behavior, and adjusting the presentation of new data for labeling according to the user's responses and behavior.

The illustrative embodiments are described with respect to certain types of contents, documents, document types, media, media types, images, audio recordings, monitoring, user inputs, presentations, forecasts, thresholds, validations, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
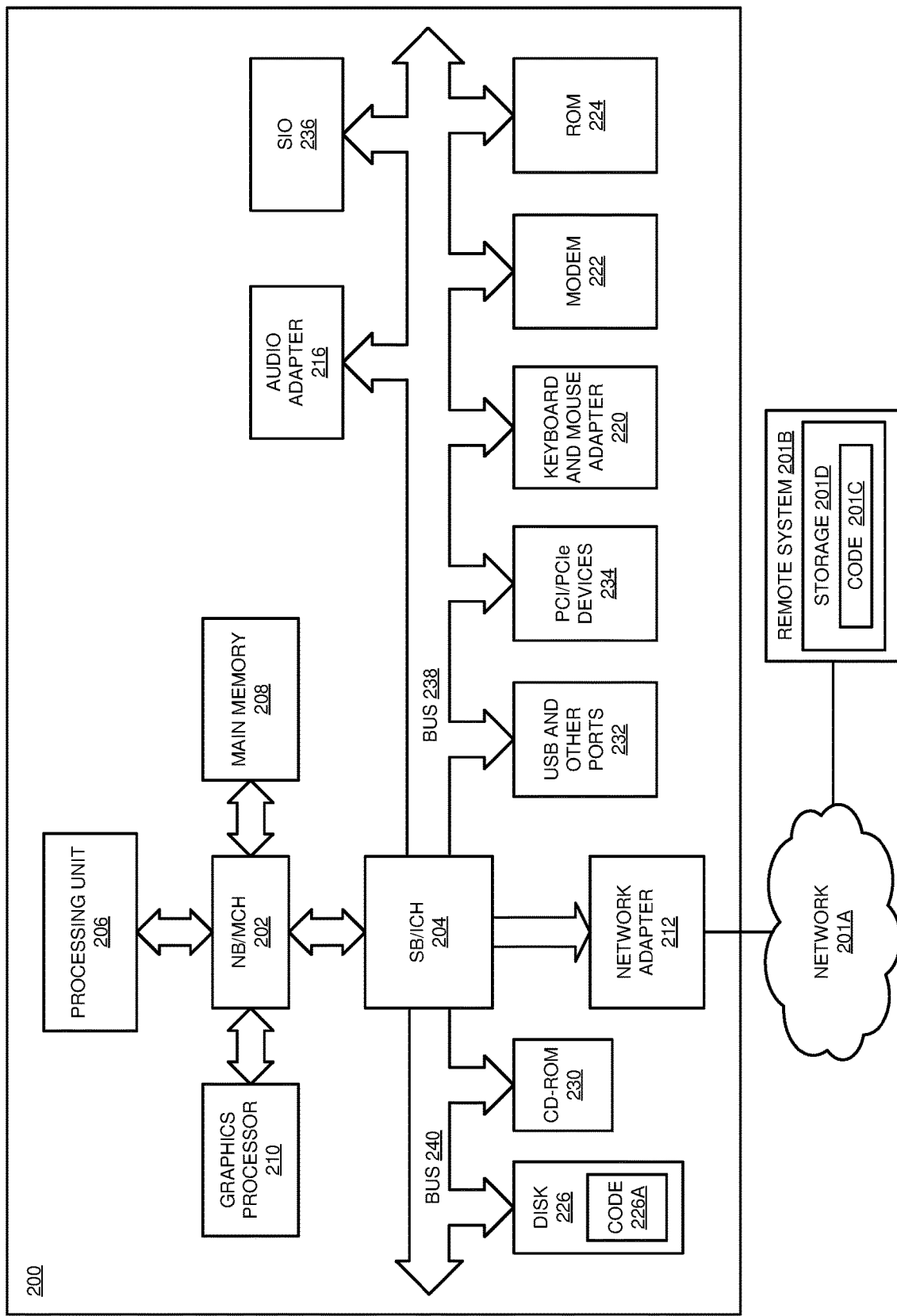
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 runs in any of clients 110, 112, and 114, and device 132 and interacts with a user using any user input component and any user output component in any of clients 110, 112, and 114, and device 132. For example, each of clients 110, 112, and 114, and device 132 includes a display screen, a keyboard or stylus for text input, and a pointing device. Client 114 also includes camera 136 and microphone 138. Application 105 also runs in servers 104 and 106, using any of clients 110, 112, and 114, and device 132 to interact with a user.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or usergenerated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
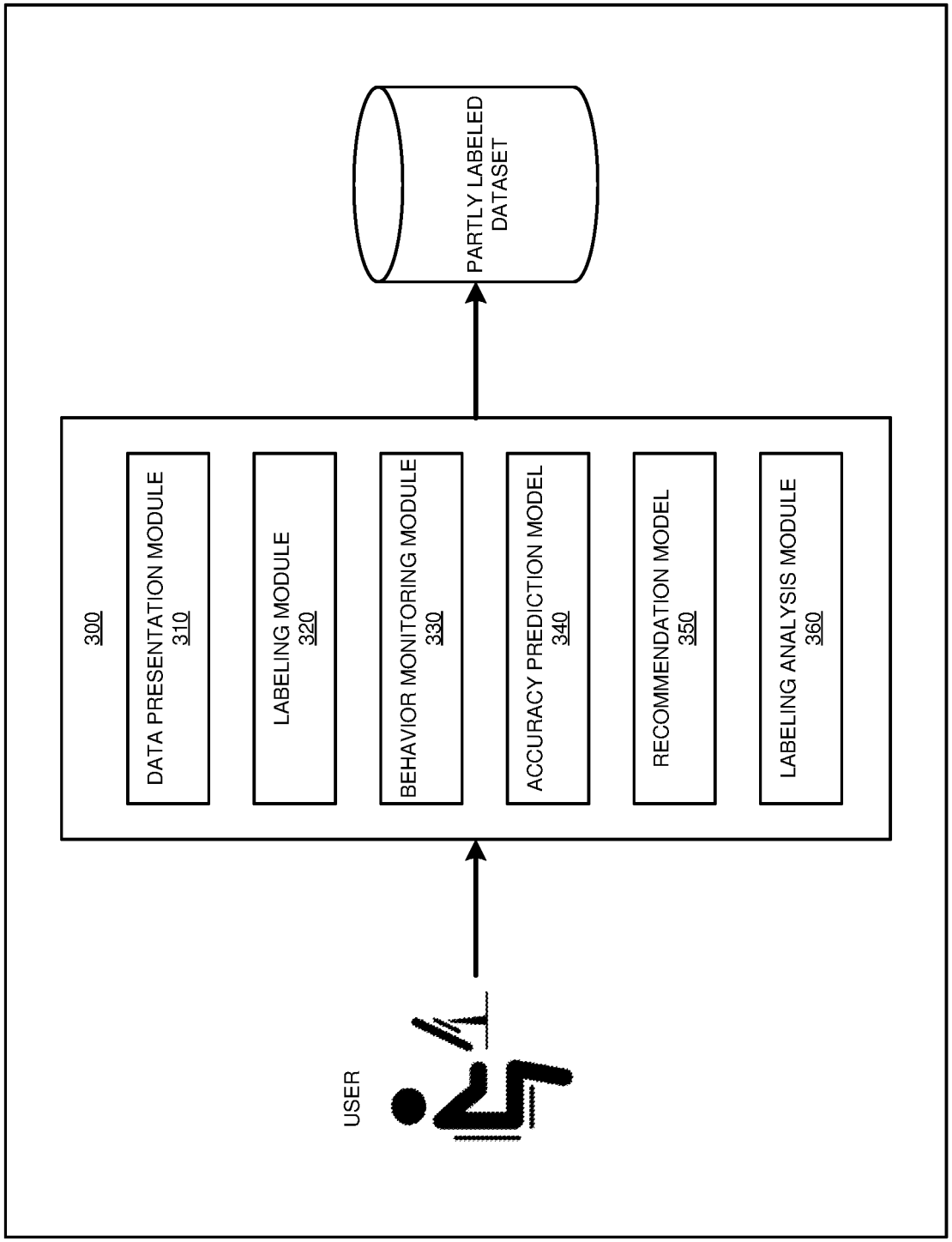
FIG. 3 depicts a block diagram of an example configuration for user adapted data labeling in accordance with an illustrative embodiment.

With reference to FIG. 3, this figure depicts a block diagram of an example configuration for user adapted data labeling in accordance with an illustrative embodiment. Application 300 is an example of application 105 in FIG. 1 and executes in any of server 104 and 106, client 110, 112, and 114, and device 132 in FIG. 1.

Data presentation module 310 presents a piece of data to a user for labeling, or causes the presentation of a piece of data to a user for labeling. Such data can be in any format perceivable by a user, such as audio, video, a static image, text, or a combination of more than one format.

Labeling module 320 receives user input labeling the presented data. Such labeling input can be in any suitable format, such as a selection from a displayed list or one or more selections from a set of checkboxes, free-form text input, a voice annotation (such as "yes" or "no"), or provided using another method.

Behavior monitoring module 330 monitors user behavior, as users enter input labeling the presented data. Behavior monitoring module 330 monitors user response time and user consistency both for one user and across users. Behavior monitoring module 330 also monitors users' data input actions, such as text input speed, one or more measures of text input accuracy (e.g. how often the user deletes and re-enters text or in a text input field), pointing device movement and pointing device click patterns (such as how many clicks are necessary for a user to successfully select a checkbox, or whether mouse movements are smooth or jerky), and the like. As well, if appropriate hardware is available, behavior monitoring module 330 monitors aspects of user behavior that are not direct inputs to application 300. For example, if a camera is available, behavior monitoring module 330 uses the camera and facial expression monitoring techniques to monitor users' facial expressions—such as closing their eyes more frequently, or opening their eyes wider or blinking more frequently. As another example, if a microphone is available, behavior monitoring module 330 uses the microphone and sound recognition techniques to monitor the sounds users make, such as yawning or talking.

Accuracy prediction model 340 receives user behavior as an input (from behavior monitoring module 330) and predicts user accuracy in labeling as an output. Accuracy prediction model 340 uses rules correlating particular combinations of user behavior with particular accuracy rates. For example, one such rule might be that when the time it takes a user to label a new piece of data rises to more than two standard deviations above the user's average response time, inaccuracy can be expected to increase to the same degree. A more complex rule might be that when user labeling consistency falls outside a consistency threshold, the user revises his or her text entries at a rate one standard deviation higher than the user's average revision rate, and the user's eyes appear to be closed for more than one standard deviation away from the user's average, inaccuracy can also be expected to rise to a predicted degree (because the user appears to be falling asleep). Accuracy prediction model 340 is trained using known machine learning techniques. An initial version of accuracy prediction model 340 is not based only on observations of the behavior of one particular user, and is not specific to any particular user or eventual user of application 300.

Recommendation model 350 receives predictions of user inaccuracy from accuracy prediction model 340 and the data a user has recently been presented with to label (by data presentation module 310) and produces one or more recommendations for the next data to be presented to a user. Recommendation model 350 uses rules correlating particular combinations of recent data presented to a user with particular accuracy rates. For example, one such might be that if the user has been reviewing voice data for the last thirty minutes and is predicted to exhibit more than a threshold level of accuracy in the next five minutes, the user should switch to reviewing a different type of media. Recommendation model 350 is trained using known machine learning techniques. An initial version of recommendation model 350 is not based only on observations of the behavior of one particular user, and is not specific to any particular user or eventual user of application 300.

Recommendation model 350 produces recommendations for the next data to be presented to a user. These recommendations are routed to data presentation module 310, to guide module 310 in determining new data to present to the user for labeling. For example, if recommendation model 350 determines that a user is becoming inaccurate while labeling one type of media or document, the model might notify data presentation module 310 to present this user with a different type of media or different document type. Recommendation model 350 can also notify data presentation module 310 that the user is becoming too inaccurate to continue any labeling. As a result, data presentation module 310 could suggest or mandate that the user take a rest break away from the embodiment, or interact with the embodiment while standing or walking.

Application 300 uses labeling analysis module 360 and the results of the recommendations of recommendation model 350, as shown by a specific user's subsequent behavior and labeling results, to adapt both accuracy prediction model 340 and recommendation model 350 to this specific user. For example, if accuracy prediction model 340 predicts an increased inaccuracy rate for a user when classifying text documents, but labeling analysis module 360 determines the user's labeling of text documents remains consistent with both the user's previous results and those of others, accuracy prediction model 340 is adjusted accordingly. Perhaps this user finds text classification easy enough that tiredness does not affect his consistency. As another example, if accuracy prediction model 340 predicts an increased inaccuracy rate for a new user on the basis of detecting a series of rapid eyeblinks, but labeling analysis module 360 determines that the user's labeling remains consistent with others' labeling, accuracy prediction model 340 is adjusted accordingly. Perhaps this user simply blinks more rapidly than average, and this behavior is not predictive of inaccuracy for this particular user.

Similarly, if recommendation model 350 recommends switching the data presented to the user to a different type of document, but accuracy prediction model 340 predicts that the user's predicted inaccuracy will still remain high, perhaps this was not enough of a change for this particular user. Instead, recommendation model 350 might recommend that data presentation module 310 present the user with a different media type, if one is available for the user to label.

Thus, each model, while initially configured to recommend actions for a generic user, gradually adapts to the particularities of an individual user. Such adaptations can also be incorporated into updated versions of the generic models once sufficient user data has been collected.

Figure 4:
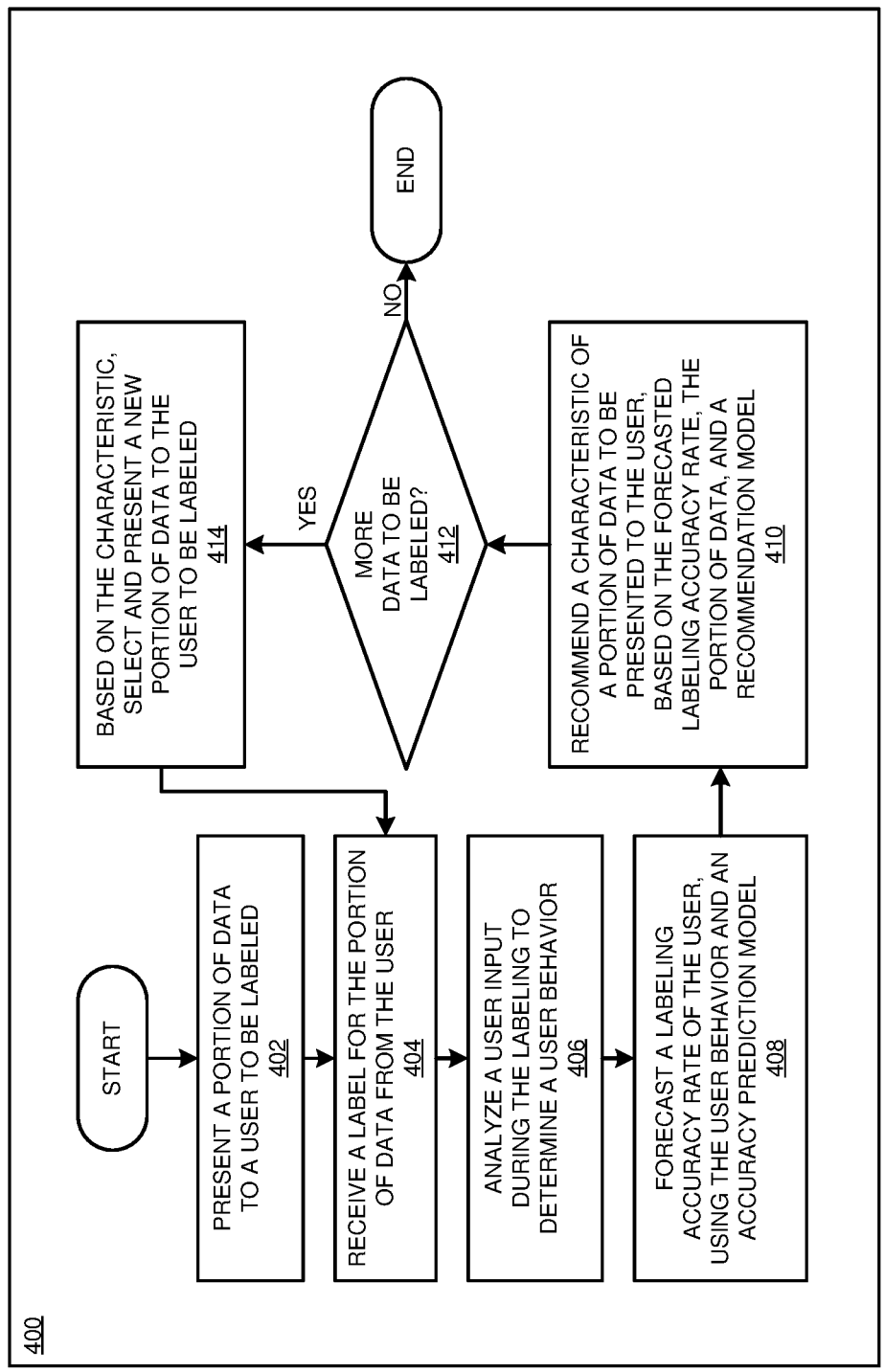
FIG. 4 depicts a flowchart of an example process for user adapted data labeling in accordance with an illustrative embodiment.

With reference to FIG. 4, this figure depicts a flowchart of an example process for user adapted data labeling in accordance with an illustrative embodiment. Process 400 can be implemented in application 300 in FIG. 3.

In block 402, the application presents a portion of data to a user to be labeled. In block 404, the application receives a label corresponding to the portion of data from the user. In block 406, the application analyzes a user input during the labeling to determine a user behavior. In block 408, the application forecasts a labeling accuracy rate for the user, using the user behavior and an accuracy prediction model. In block 410, the application recommends a characteristic of a portion of data to be presented to the user, based on the labeling accuracy rate, the portion of data, and a recommendation model. In block 412, the application checks whether there is more data to be labeled. If so ("YES" path of block 412), in block 414 the application selects and presents a new portion of data to the user for labeling, based on the characteristic. Then the application returns to block 404. If not ("NO" path of block 412), the application ends.

Figure 5:
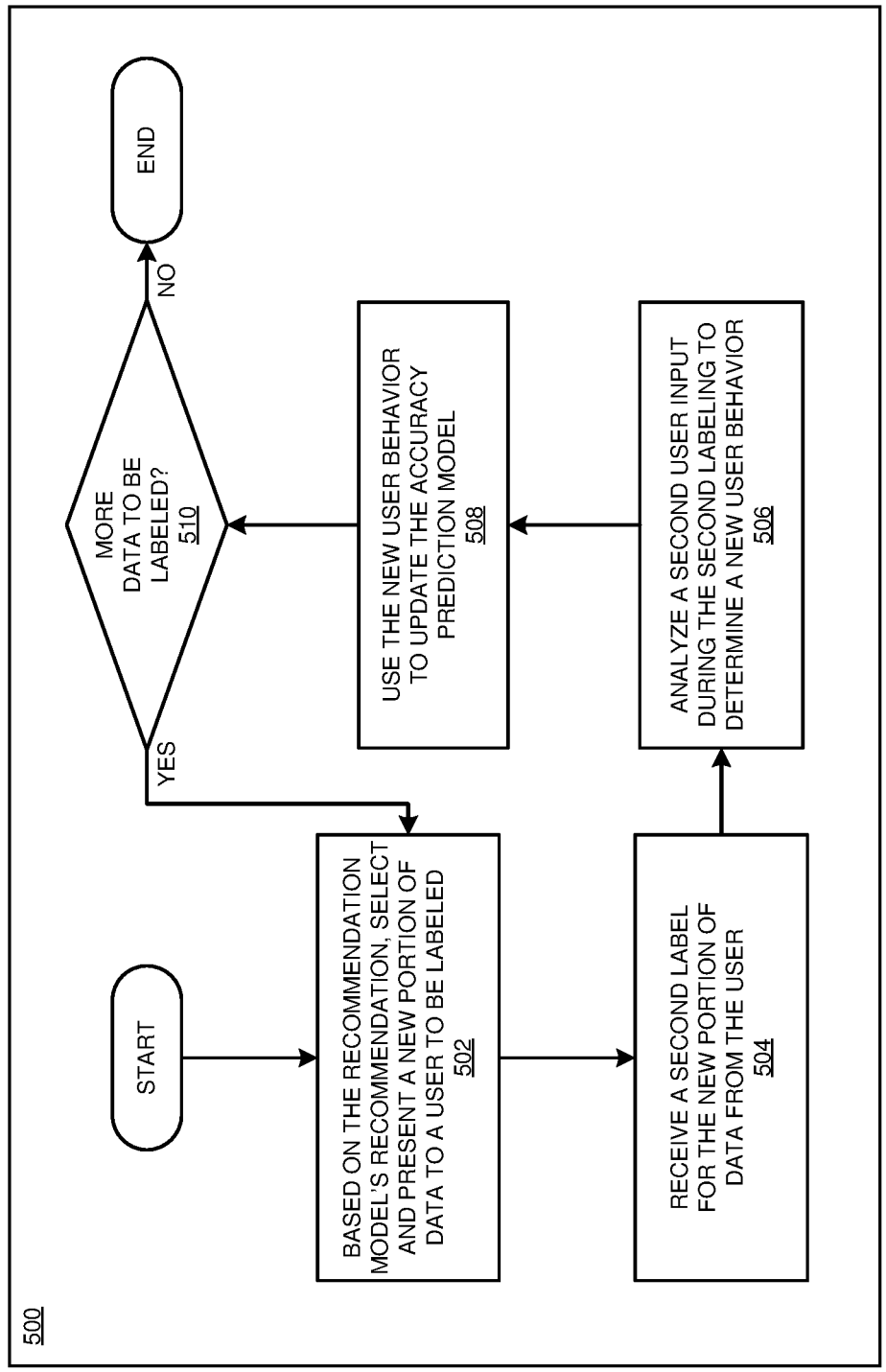
FIG. 5 depicts a flowchart of an additional portion of an example process for user adapted data labeling in accordance with an illustrative embodiment.

With reference to FIG. 5, this figure depicts a flowchart of an additional portion of an example process for user adapted data labeling in accordance with an illustrative embodiment. Process 500 can be implemented in application 300 in FIG. 3, and can form a part of process 400 in FIG. 4.

In block 502, the application, based on a recommendation model's recommendation, selects and presents a new portion of data to a user to be labeled. In block 504, the application receives a second label corresponding to the new portion of data from the user. In block 506, the application analyzes a second user input during the second labeling to determine a new user behavior. In block 508, the application uses the new user behavior to update the accuracy prediction model. In block 510, the application checks whether there is more data to be labeled. If so ("YES" path of block 510), the application returns to block 502. If not ("NO" path of block 510), the application ends.

Figure 6:
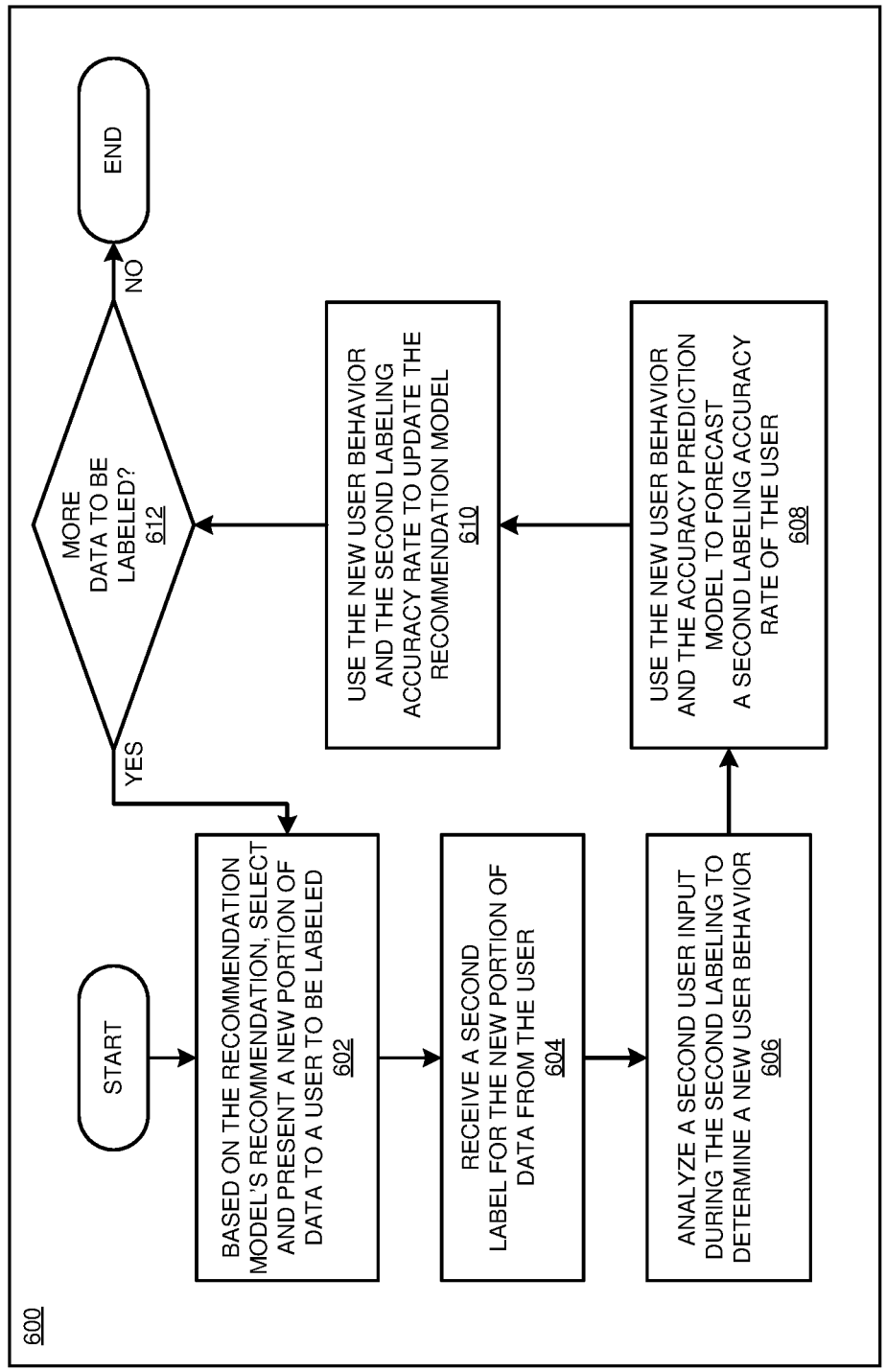
FIG. 6 depicts a flowchart of an additional portion of an example process for user adapted data labeling in accordance with an illustrative embodiment.

With reference to FIG. 6, this figure depicts a flowchart of an additional portion of an example process for user adapted data labeling in accordance with an illustrative embodiment. Process 600 can be implemented in application 300 in FIG. 3, and can form a part of process 400 in FIG. 4.

In block 602, the application, based on a recommendation model's recommendation, selects and presents a new portion of data to a user to be labeled. In block 604, the application receives a second label corresponding to the new portion of data from the user. In block 606, the application analyzes a second user input during the second labeling to determine a new user behavior. In block 608, the application uses the new user behavior and the accuracy prediction model to forecast a second labeling accuracy rate of the user. In block 610, the application uses the new user behavior and the second labeling accuracy rate to update the recommendation model. In block 612, the application checks whether there is more data to be labeled. If so ("YES" path of block 612), the application returns to block 602. If not ("NO" path of block 510), the application ends.

Thus, a computer implemented method, system or apparatus, and computer program product are provided in the illustrative embodiments for user adapted data labeling and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
analyzing a user input during labeling of a first portion of data to determine a behavior of a user, the labeling of the first portion of data comprising applying a first classification to the first portion of data, the first classification selected from a first set of possible classifications;
forecasting, using the behavior and an accuracy prediction model, a labeling accuracy rate of the user;
determining, using the forecasted labeling accuracy rate, the first portion of data, and a recommendation model, a characteristic of a second portion of data to be presented to the user at a second time;
presenting, to the user for labeling, the second portion of data, the second portion of data selected for presentation according to the characteristic;
receiving, from the user, a second label corresponding to the second portion of data, the second label comprising a second classification applied to the second portion of data, the second classification selected from a second set of possible classifications;
analyzing a second user input to determine a second behavior of the user, the second user input exhibited while the second portion of data is presented to the user for labeling;
refining, using the second behavior, the accuracy prediction model;

forecasting, using the second behavior and the accuracy prediction model, a second labeling accuracy rate of the user; and refining, using the second behavior and the second labeling accuracy rate, the recommendation model.

2. The method of claim 1, wherein analyzing a user input during labeling of a first portion of data to determine a behavior of a user comprises:

computing a response time for the user, the response time comprising a difference between the second time and a first time at which the first portion of data is presented for labeling.

3. The method of claim 1, wherein analyzing a user input during labeling of a first portion of data to determine a behavior of a user comprises:

comparing the label to a second label corresponding to the first portion of data, the second label previously applied by the user to the first portion of data; and computing, based on the label and the second label, a consistency score for the user, the consistency score measuring a degree of consistency between the label and the second label.

4. The method of claim 1, wherein analyzing a user input during labeling of a first portion of data to determine a behavior of a user comprises:

comparing the label to a third label corresponding to a third portion of data, the third label previously applied by the user to the third portion of data, the third portion of data being above a threshold degree of similarity to the first portion of data; and computing, based on the label and the third label, a consistency score for the user, the consistency score measuring a degree of consistency between the label and the third label.

5. The method of claim 1, wherein analyzing a user input during labeling of a first portion of data to determine a behavior of a user comprises:

comparing the label to a second label corresponding to the first portion of data, the second label previously applied by a second user to the first portion of data; and computing, based on the label and the second label, a consistency score for the user, the consistency score measuring a degree of consistency between the label and the second label.

6. The method of claim 1, wherein analyzing a user input during labeling of a first portion of data to determine a behavior of a user comprises:

comparing the label to a third label corresponding to a third portion of data, the third label previously applied by a second user to the third portion of data, the third portion of data being above a threshold degree of similarity to the first portion of data; and computing, based on the label and the third label, a consistency score for the user, the consistency score measuring a degree of consistency between the label and the third label.

7. The method of claim 1, wherein analyzing a user input during labeling of a first portion of data to determine a behavior of a user comprises:

measuring a text input speed of the user;
determining a text input accuracy of the user;
determining a pattern of pointing device inputs of the user; and
computing, based on the text input speed, text input accuracy, and pattern of pointing device inputs, a data input efficiency score of the user.

8. The method of claim 1, wherein analyzing a user input during labeling of a first portion of data to determine a behavior of a user comprises determining a facial expression of the user.

9. The method of claim 1, wherein analyzing a user input during labeling of a first portion of data to determine a behavior of a user comprises recognizing a speech input of the user.

10. A computer usable program product comprising one or more computer-readable storage devices, and program instructions stored on at least one of the one or more storage devices, the stored program instructions comprising:

program instructions to analyze a user input during labeling of a first portion of data to determine a behavior of a user, the labeling of the first portion of data comprising applying a first classification to the first portion of data, the first classification selected from a first set of possible classifications;

program instructions to forecast, using the behavior and an accuracy prediction model, a labeling accuracy rate of the user;

program instructions to determine, using the forecasted labeling accuracy rate, the first portion of data, and a recommendation model, a characteristic of a second portion of data to be presented to the user at a second time;

program instructions to present, to the user for labeling, the second portion of data, the second portion of data selected for presentation according to the characteristic;

program instructions to receive, from the user, a second label corresponding to the second portion of data, the second label comprising a second classification applied to the second portion of data, the second classification selected from a second set of possible classifications;

program instructions to analyze a second user input to determine a second behavior of the user, the second user input exhibited while the second portion of data is presented to the user for labeling;

program instructions to refine, using the second behavior, the accuracy prediction model;

program instructions to forecast, using the second behavior and the accuracy prediction model, a second labeling accuracy rate of the user; and program instructions to refining, using the second behavior and the second labeling accuracy rate, the recommendation model.

11. The computer usable program product of claim 10, wherein program instructions to analyze a user input during labeling of a first portion of data to determine a behavior of a user comprises:

program instructions to compute a response time for the user, the response time comprising a difference between the second time and a first time at which the first portion of data is presented for labeling.

12. The computer usable program product of claim 10, wherein program instructions to analyze a user input during labeling of a first portion of data to determine a behavior of a user comprises:

program instructions to compare the label to a second label corresponding to the first portion of data, the second label previously applied by the user to the first portion of data; and program instructions to compute, based on the label and the second label, a consistency score for the user, the consistency score measuring a degree of consistency between the label and the second label.

13. The computer usable program product of claim 10, wherein program instructions to program instructions to analyze a user input during labeling of a first portion of data to determine a behavior of a user comprises:
program instructions to compare the label to a third label corresponding to a third portion of data, the third label previously applied by the user to the third portion of data, the third portion of data being above a threshold degree of similarity to the first portion of data; and
program instructions to compute, based on the label and the third label, a consistency score for the user, the consistency score measuring a degree of consistency between the label and the third label.

14. The computer usable program product of claim 10, wherein program instructions to analyze a user input during labeling of a first portion of data to determine a behavior of a user comprises:
program instructions to compare the label to a second label corresponding to the first portion of data, the second label previously applied by a second user to the first portion of data; and
program instructions to compute, based on the label and the second label, a consistency score for the user, the consistency score measuring a degree of consistency between the label and the second label.

15. The computer usable program product of claim 10, wherein program instructions to analyze a user input during labeling of a first portion of data to determine a behavior of a user comprises:
program instructions to compare the label to a third label corresponding to a third portion of data, the third label previously applied by a second user to the third portion of data, the third portion of data being above a threshold degree of similarity to the first portion of data; and
program instructions to compute, based on the label and the third label, a consistency score for the user, the consistency score measuring a degree of consistency between the label and the third label.

16. The computer usable program product of claim 10, wherein program instructions to analyze a user input during labeling of a first portion of data to determine a behavior of a user comprises:
program instructions to measuring a text input speed of the user;
program instructions to determine a text input accuracy of the user;
program instructions to determine a pattern of pointing device inputs of the user; and
program instructions to compute, based on the text input speed, text input accuracy, and pattern of pointing device inputs, a data input efficiency score of the user.

17. The computer usable program product of claim 10, wherein program instructions to analyze a user input during labeling of a first portion of data to determine a behavior of a user comprises program instructions to determine a facial expression of the user.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze a user input during labeling of a first portion of data to determine a behavior of a user, the labeling of the first portion of data comprising applying a first classification to the first portion of data, the first classification selected from a first set of possible classifications;
program instructions to forecast, using the behavior and an accuracy prediction model, a labeling accuracy rate of the user;
program instructions to determine, using the forecasted labeling accuracy rate, the first portion of data, and a recommendation model, a characteristic of a second portion of data to be presented to the user at a second time;
program instructions to present, to the user for labeling, the second portion of data, the second portion of data selected for presentation according to the characteristic;
program instructions to receive, from the user, a second label corresponding to the second portion of data, the second label comprising a second classification applied to the second portion of data, the second classification selected from a second set of possible classifications;
program instructions to analyze a second user input to determine a second behavior of the user, the second user input exhibited while the second portion of data is presented to the user for labeling;
program instructions to refine, using the second behavior, the accuracy prediction model;
program instructions to forecast, using the second behavior and the accuracy prediction model, a second labeling accuracy rate of the user; and
program instructions to refining, using the second behavior and the second labeling accuracy rate, the recommendation model.

* * * * *